United States Patent
Wang et al.

(10) Patent No.: US 8,677,511 B2
(45) Date of Patent: Mar. 18, 2014

(54) APPARATUS FOR CHARGED PARTICLE LITHOGRAPHY SYSTEM

(75) Inventors: Shih-Chi Wang, Taipei (TW); Jeng-Horng Chen, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/462,315

(22) Filed: May 2, 2012

(65) Prior Publication Data
US 2013/0293899 A1 Nov. 7, 2013

(51) Int. Cl.
*G01Q 20/02* (2010.01)

(52) U.S. Cl.
USPC ............... 850/6; 850/1; 850/3; 850/5; 850/7; 250/492.3

(58) Field of Classification Search
USPC ............ 850/1, 2, 3, 5, 6, 7, 8, 9; 250/491.1, 250/492.1, 492.2, 492.22, 492.3
See application file for complete search history.

(56) References Cited

U.S. PATENT DOCUMENTS

| | | | |
|---|---|---|---|
| 7,265,364 B2 | 9/2007 | Teunissen et al. | |
| 2009/0205091 A1* | 8/2009 | Haaheim et al. | 850/33 |
| 2011/0051306 A1 | 3/2011 | Wang et al. | |

* cited by examiner

*Primary Examiner* — Nicole Ippolito
(74) *Attorney, Agent, or Firm* — Haynes and Boone, LLP

(57) ABSTRACT

The present disclosure describes an apparatus of leveling a substrate in a charged particle lithography system. In an example, the apparatus includes a cantilever-based sensor that includes an optical sensor and a cantilever structure. The optical sensor determines a distance between the optical sensor and a surface of the substrate based on light reflected from the cantilever structure. In an example, a first distance is between the cantilever structure and optical sensor, a second distance is a height of the cantilever structure, and a third distance is between the optical sensor and the surface of the substrate. The optical sensor determines the first distance based on the light reflected from the cantilever structure, such that the third distance is determined from the first distance and the second distance.

20 Claims, 5 Drawing Sheets

APPARATUS FOR CHARGED PARTICLE LITHOGRAPHY SYSTEM

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC processing and manufacturing are needed.

For example, light diffraction in an optical lithography system becomes an obstacle for further scaling down the feature size. Common techniques used to decrease the light diffraction impact includes an optical proximity correction (OPC), a phase shift mask (PSM), and an immersion optical lithography system. A charged particle lithography system is another alternative to scale down the feature size. One of the challenges in the charged particle lithography system is to level a resist film deposited on a substrate for exposing the resist film by an optical sensor. Another challenge is electric static charges on the resist film in the charged particle lithography system Accordingly, what is needed is a method or an apparatus to address the issues in the charged particle lithography process.

BRIEF DESCRIPTION OF THE DRAWINGS

The present disclosure is best understood from the following detailed description when read with accompanying figures. It is emphasized that, in accordance with the standard practice in the industry, various features are not drawn to scale and are used for illustration purpose only. In fact, the dimension of the various features may be arbitrarily increased or reduced for clarity of discussion.

DETAILED DESCRIPTION

Figure 1:
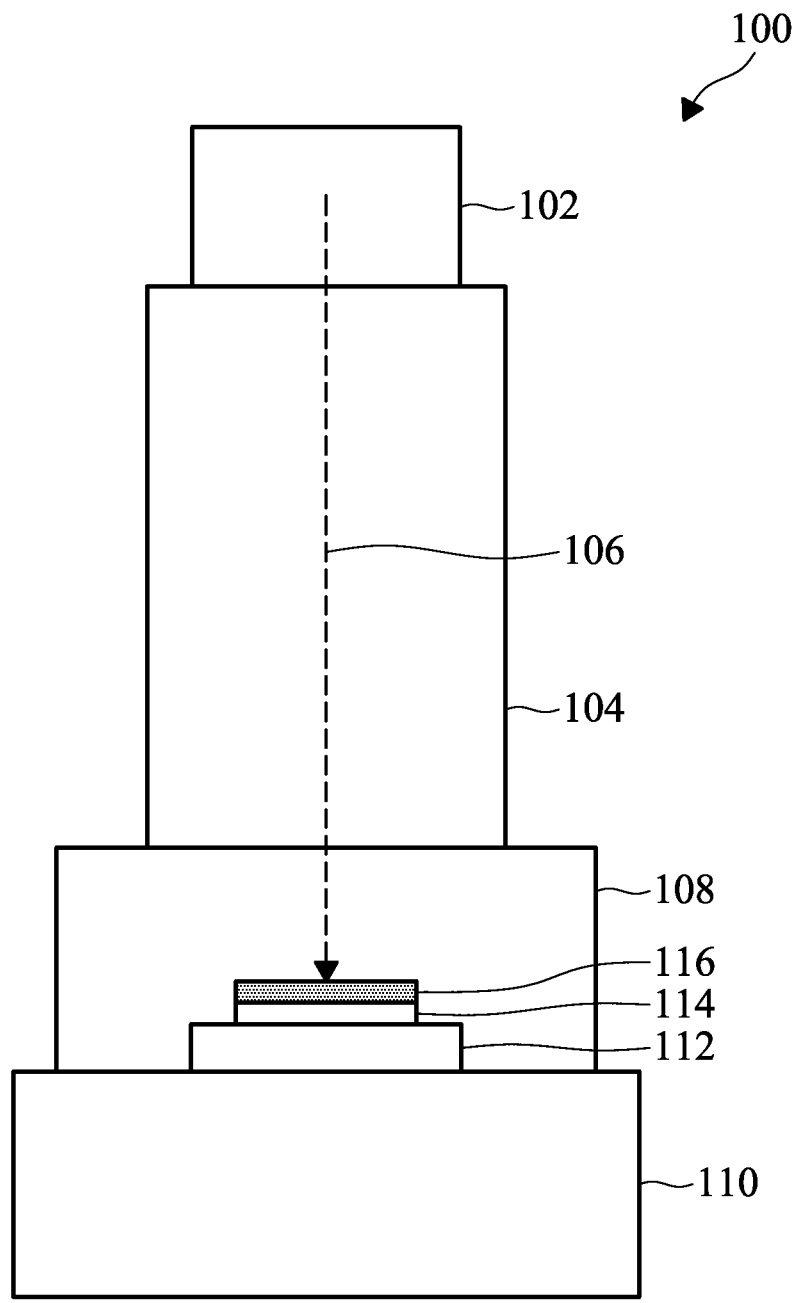
FIG. 1 represents a schematic diagram of a charged particle lithography system for implementing one or more embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, a charged particle lithography system 100 is an example of a system that can benefit from one or more embodiments of the present disclosure. The charged particle lithography system 100 includes an electron particle source 102, an electron optical column 104, an electron beam 106, a chamber 108, a pump unit 110, a stage 112, a substrate 114, and a resist film 116 according to one or more embodiments of the present disclosure. However, other configurations and inclusion or omission of devices may be possible. In the present disclosure, the charged particle lithography system is also referred to as an electron beam lithography system, an electron beam writer system, and an electron beam writer. The electron particle source 102 provides a plurality of electrons emitted from a conducting material by heating the conducting material to a very high temperature, where the electrons have sufficient energy to overcome a work function barrier and escape from the conducting material (thermionic sources), or by applying an electric field sufficiently strong that the electrons tunnel through the work function barrier (field emission sources). The electron optical column 104 is comprised of a plurality of electromagnetic apertures, electrostatic lenses, electromagnetic lenses, shaping deflectors and cell selection deflectors; and provides the electron beam 106, such as a plurality of Gaussian spot electron beams, a plurality of variable shaped electron beams, or a plurality of cell projection electron beams. The chamber 108 is comprised of a wafer loading and unloading unit, and provides the wafer transportation without interrupting an operation of the electron beam lithography system 100 when loading the wafer into the system and unloading the wafer out of the system. The pump unit 110 is comprised of a plurality of pumps and filters, and provides a high vacuum environment for the electron beam lithography system 100. The stage 112 is comprised of a plurality of motors, roller guides, and tables; secures the substrate 114 on the stage 112 by vacuum; and provides accurate position and movement of the substrate 114 in X, Y and Z directions during a leveling, a focus, and an exposure operation of the substrate 114 in the electron writer system 100.

Continuing with the present embodiments, the substrate 114 deposited with the resist film 116 is loaded on the stage 112 for the electron beam 106 exposure. In the present disclosure, the resist is also referred to as a photo resist, an electron beam resist, a resist film and a photo resist film. The substrate 114 includes a wafer substrate or a blank mask substrate. The wafer substrate includes a silicon wafer. Alternatively or additionally, the wafer may includes another elementary semiconductor, such as germanium; a compound semiconductor including silicon carbide, gallium arsenic, gallium phosphide, indium phosphide, indium arsenide, and/or indium antimonide; an alloy semiconductor including SiGe, GaAsP, AlInAs, AlGaAs, GaInAs, GaInP, and/or GaInAsP. In yet another alternative, the wafer is a semiconductor on insulator (SOI). A plurality of conductive and non-conductive thin films may be deposited on the wafer. For example, the conductive thin films may include a metal such as aluminum (Al), Copper (Cu), tungsten (W), nickel (Ni), titanium (Ti), gold (Au), and platinum (Pt) and, thereof an alloy of the metals. The insulator film may include silicon oxide and silicon nitride. The blank mask substrate may include a low thermal expansion material such as quartz, silicon, silicon carbide, or silicon oxide-titanium oxide compound.

Figure 2:
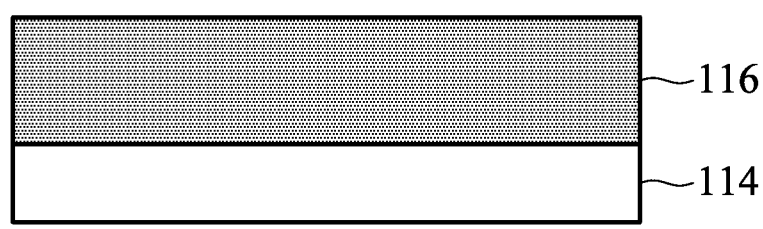
FIGS. 2-4 are cross-sectional side views illustrating forming a resist pattern according to one or more embodiments of the present disclosure.
Figure 3:
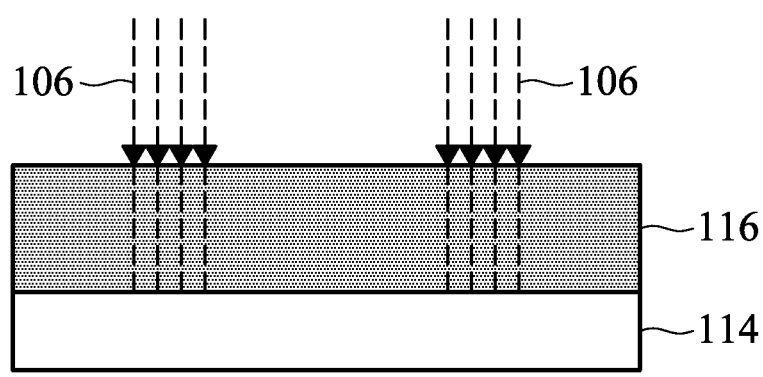
Figure 4:
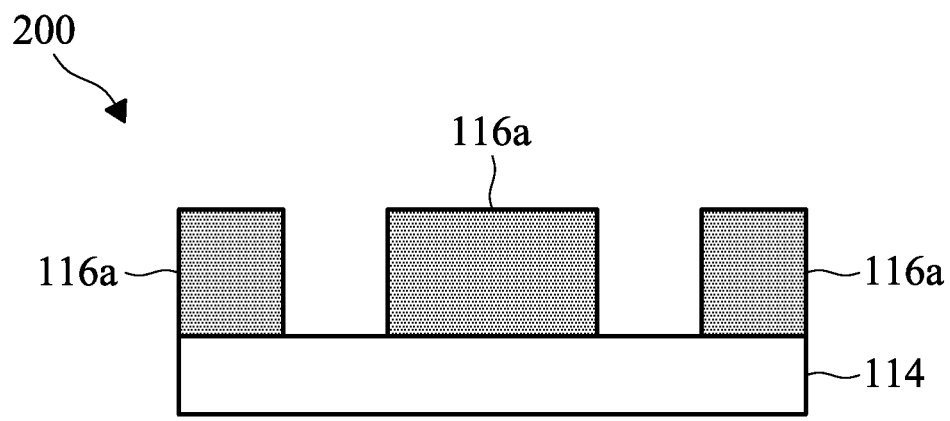

Referring now to FIGS. 2-4, a process 200 can be used with the system 100 to implement one or more embodiments of the prevent invention. Referring to FIG. 2, the resist film 116 is deposited on the substrate 114, for example, by a spin-on coating process followed by a soft bake (SB) process. The resist film 116 may include a positive tone resist or a negative tone resist. The resist film 116 may include a single resist film or a multiple layer resist film. Referring to FIG. 3, the resist film 116 is exposed by the electron beam 106 in the system 100 as shown in FIG. 1 to form a latent image pattern in the resist film 116. After the exposure, a developer is applied to the surface of the resist film 116 for developing a resist pattern. The develop process may include a post exposure process (PEB), a post develop bake (PDB) or both. The final resist pattern depends on the resist tone of the resist film 116. For example, if the resist film 116 is a positive tone resist applied to the substrate 114, the exposed portions of the resist film 116 are dissolved during the developing process and the unexposed portions of the resist film 116 remain to form a pattern resist film 116a, providing the final resist pattern shown in FIG. 4.

Figure 5:
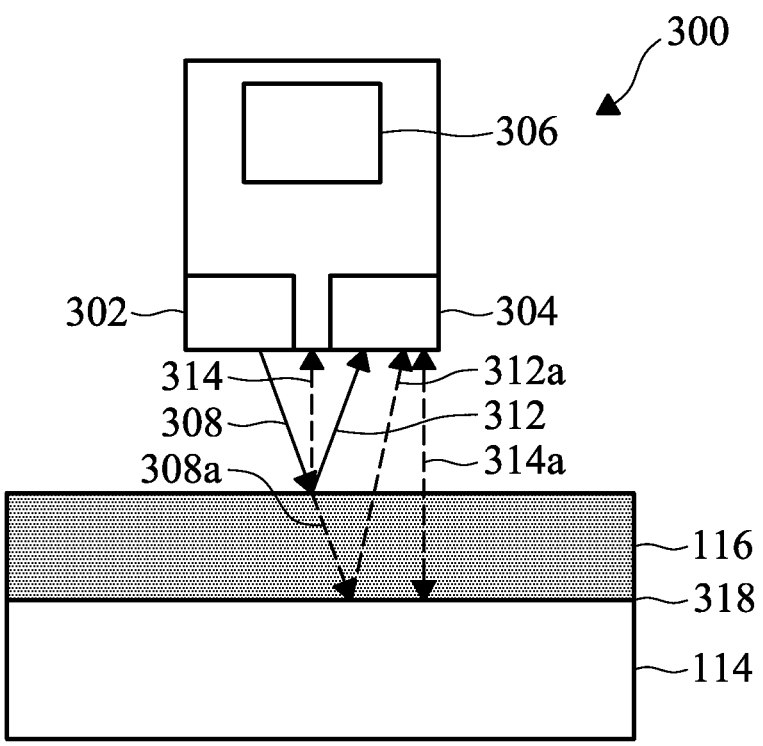
FIG. 5 is an apparatus for leveling a substrate in a charged particle lithography system for implementing one or more embodiments of the present disclosure.

Referring now to FIG. 5, an optical sensor system 300 for leveling the resist film 116 deposited on the substrate 114 loaded on the stage 112 of the charged particle lithography system 100 is illustrated according to one or more embodiments of the present disclosure. The leveling operation is performed by the optical sensor system 300 before focusing and exposing the substrate 114 in the system 100. The optical sensor system 300 includes a light source 302, a light detector 304 and a data processor 306. However, other configurations and inclusion or omission of devices may be possible. In the present disclosure, an optical sensor system is also referred to as an optical sensor. A measurement light 308 emitted from the source 302 of the optical sensor system 300 is projected on a surface of the resist film 116 deposited on the substrate 114. At the surface of the resist film 116, a reflected light 312 is generated. The reflected light 312 is collected by the light detector 304 and is transformed into an electrical signal. The electrical signal is sent to the data processor 306, and a distance 314 between the surface of the resist film 116 and the optical sensor 300 is calculated. The distance 314 is measured at multiple locations of the surface of the resist film 116. The surface of the resist film 116 deposited on the substrate 114 is leveled according to the distance 314 at different locations of the surface of the resist film 116. In an example, at least three location measurements are needed to level the surface of the resist film 116 deposited on the substrate 114.

However in an example, if the resist film is transparent or partially transparent to the measurement light 308, a light 308a split from the light 308 can continuously travel into the resist film 116 until hitting an interface 318 of the substrate 114 and the resist film 116 and then reflecting at the interface 318 to form a reflected light 312a. A distance 314a is calculated from the reflected light 312a. Therefore the leveling result by the optical sensor 300 is disturbed from a difference between the distance 312 and the distance 312a at the same location on the resist film 116 deposited on the substrate 114. Another issue with the apparatus 300 is an irregular reflective light caused by a pattern topology on the substrate 114. The irregular reflective light may interfere with the measurement light 308 and the reflected light 312 and 312a, and therefore a leveling error may be caused.

Figure 6:
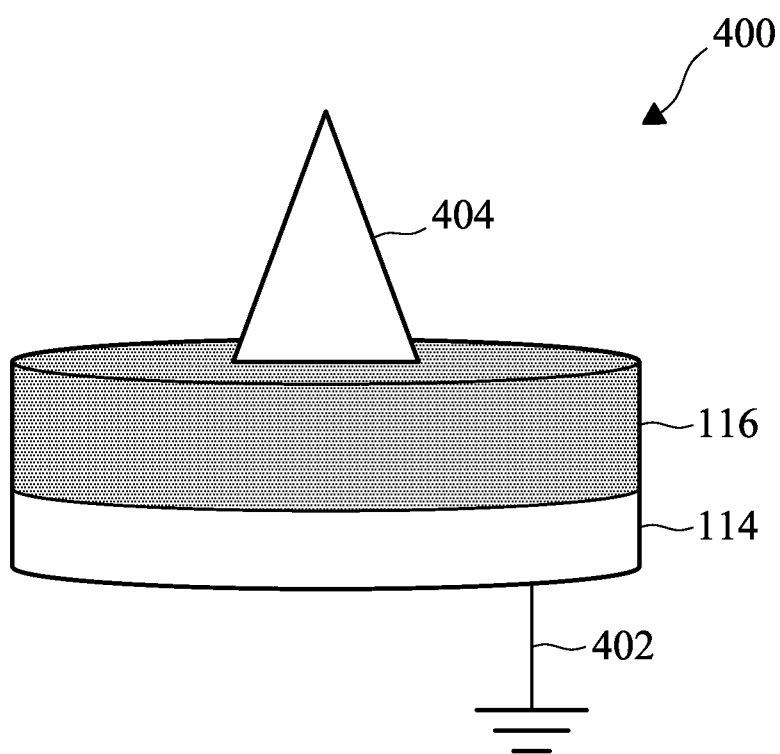
FIG. 6 is a setup for draining a charge on a surface of a substrate in a charged particle lithography system for implementing one or more embodiments of the present disclosure.

Referring now to FIG. 6, a setup 400 for draining charges accumulated on the resist film during an exposing process in the charged particle lithography system 100 is illustrated according to one or more embodiments of the present disclosure. The setup 400 includes a ground electrode 402. However, other configurations and inclusion or omission of devices may be possible. The ground electrode 402 contacts the back side of the substrate 114 and drains charges 404 on the surface of the resist film 116 to the ground. When the resist film 116 deposited on the substrate 114 is exposed in the charged particle lithography system 100, the charges 404 may be accumulated on the surface of the resist film 116 because the substrate 114 and the resist film 116 may be non-conductive. When more and more charges 404 are accumulated on the surface of the resist film 116, a high voltage potential is formed. When the voltage potential is accumulated, the direction of the charges 404 may be deviated from what it is supposed to be, due to the electrostatic force. The deviated beams lead to a pattern in unwanted position when forming the pattern by using the method 200 as shown in FIGS. 2-4.

Figure 7:
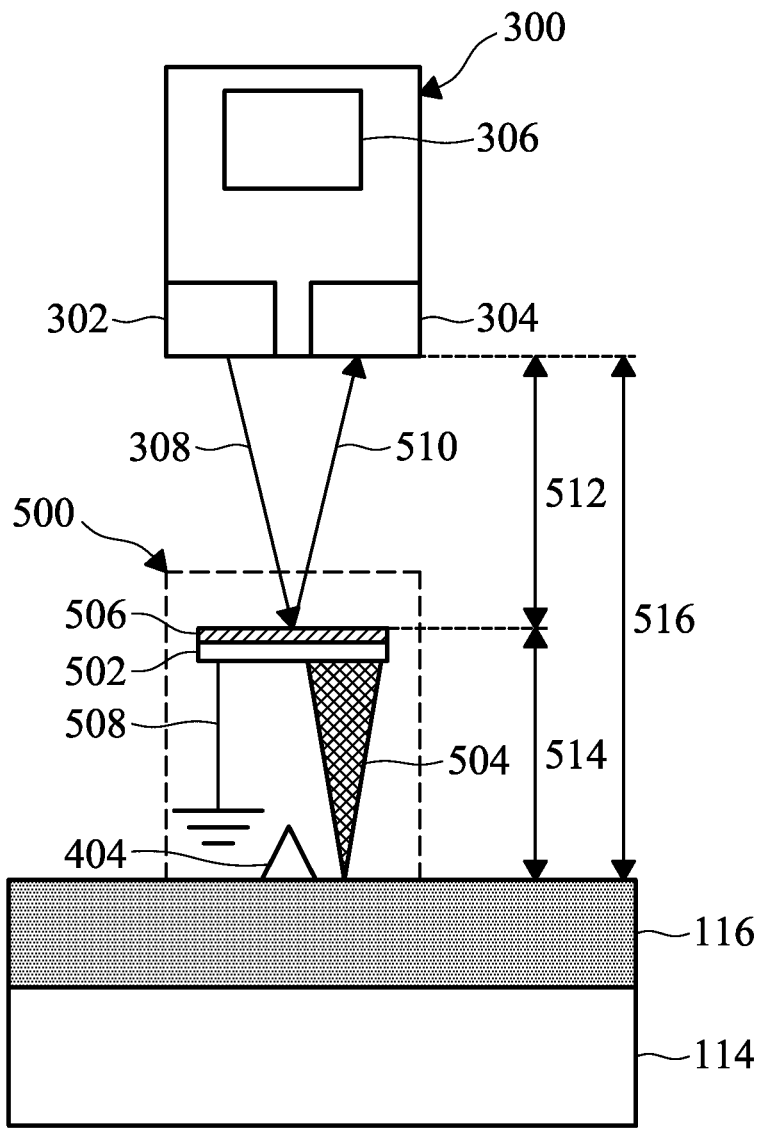
FIG. 7 is an apparatus for leveling a substrate and draining a charge on a surface of a substrate in a charged particle lithography system for implementing one or more embodiments of the present disclosure.

Referring now to FIG. 7, a cantilever-based sensor for leveling and draining charges accumulated on the resist film 116 deposited on the substrate 114 during exposing in the charged particle lithography system 100 is illustrated according to one or more embodiments of the present disclosure. The cantilever-based sensor includes a cantilever structure 500 and the optical sensor 300. The cantilever structure 500 includes a cantilever 502, a tip 504, a reflective film 506 deposited on the cantilever 502, and a ground electrode 508. The optical sensor 300 includes the light source 302, the light detector 304, and the data processor 306. However, other configurations and inclusion or omission of devices may be possible in the present disclosure. The cantilever-based sensor (including the cantilever structure 500 and the optical sensor 300) is installed in the charged particle lithography system 100 shown in FIG. 1. The cantilever 502 includes a first surface and a second surface. The cantilever 502 includes a metal material or a metal alloy thereof. The cantilever 502 is electrically conductive. The cantilever 502 can move in a horizontal direction or a vertical direction, or other direction to achieve leveling. The tip 504 is attached to the first surface of the cantilever 502. The tip 504 includes a metal material or a metal alloy thereof. The tip 504 is electrically conductive. The tip 504 can move in a horizontal or a vertical direction, or other direction to achieve leveling. The cantilever 502 adjusts a height of the tip 504. The tip 504 contacts the surface of the resist film 116 deposited on the substrate 114. In the present example, the tip 504 physically contacts the surface of the resist film 116. The reflective film 506 is deposited on the second surface of the cantilever 502. The reflective film 506 includes a metal material or a metal alloy thereof. The reflective film 506 reflects light projected thereon. The ground electrode 508 is attached to the cantilever 502.

Continuing the present embodiments, the cantilever-based sensor (including the cantilever structure 500 and the optical sensor 300) is used to level the resist film 116 deposited on the substrate 114 during exposing the resist film 116 in the charged particle lithography system 100. For example, when the measurement light 308 emitted from the light source 302 of the optical sensor 300 is projected on a surface of the reflective film 506 deposited on the second surface of the cantilever 502, the light 308 is reflected from the surface of the reflective film 506, and a reflected light 510 is formed. The reflected light 508 is collected by the light detector 304 of the optical sensor 300 and is transformed into an electrical signal. The electrical signal is sent to the data processor 306. A first distance 512 between the surface of the reflective surface 506 and the optical sensor 300 is calculated based on the reflected light 510 from the reflective surface 506. A second distance 514 is known based on a height of the cantilever structure 500. In the present example, a height of the cantilever structure 500 includes a combination of a thickness of the cantilever 502, a height of the tip 504, and a thickness of the reflective film 506. Because the second distance 514 between the surface of the resist film 116 and the surface of the reflective film 506 is known for the cantilever sensor 500, by measuring the first distance 512 by the optical sensor 300, a third distance 516 between the surface of the resist film 116 and the optical sensor 300 is calculated by adding the first distance 512 to the second distance 514. In the present example, the first distance 512 and the second distance 514 are measured at multiple locations of the resist film 116, such that multiple third distances 516 are determined. In an example, at least three third distances 516 at three different locations are needed to level the surface of the resist film 116 deposited on the substrate 114. A leveling process includes comparing the three third distances 516 from the three different locations on the surface of the resist film 116 deposited on the substrate 114, and adjusting the substrate 114 such that the third distances 516 at the three different locations on the surface of the resist film 116 are equivalent, in other words, at the same level. Therefore, the surface of the resist film 116 is leveled based on the third distance 516 between the optical sensor 300 and the surface of the resist film 116 deposited on the substrate 114 at different locations of the surface of the resist film 116.

In another example, three first distances 512 and three second distances 514 can be measured by using three optical sensors 300 and three cantilever structures 500 at three different locations at the same time, therefore three third distances 516 between the surface of the resist film 116 and the optical sensor 300 are calculated. The surface of the resist film 116 deposited on the substrate 114 is leveled by comparing the three third distances 516 and adjusting the substrate 114 accordingly. Different embodiments may have different advantages, and no particular advantage is necessarily required of any embodiment.

As shown in FIG. 7, the electric static charges 404 accumulated on resist film 116 can be drained through the tip 504, the cantilever 502, and the ground electrode 508. Therefore, one of the advantages using the cantilever sensor 500 in the charged particle lithography system is the electric static charges 404 can be drained on time preventing the electric static charge 404 accumulated on the resist film 116.

Thus, the present disclosure may provide different embodiments. An exemplary apparatus for leveling a substrate in a charged particle lithography system includes an optical sensor; and a cantilever structure disposed between the optical sensor and the substrate. The cantilever structure includes a cantilever having a first surface and a second surface opposite the first surface, a reflective film deposited on the second surface of the cantilever, and a tip attached to the first surface of the cantilever, wherein the tip is configured to contact a surface of the substrate. The optical sensor is configured to direct a measurement light onto the reflective film, detect a light reflected from the reflective film, and determine a distance between the optical sensor and the surface of the substrate based on the detected reflected light, such that the substrate is leveled based on the distance. The optical sensor further determines the distance based on a height of the cantilever structure. The apparatus may further include a ground electrode connected to the cantilever structure such that electric static charge is drained from the surface of the substrate through the tip, the cantilever, and the ground electrode. The optical sensor may include a light source for emitting the measurement light onto the reflective film, a light detector for receiving the reflected light from the reflective film, and a processor for determining the distance between the optical sensor and the surface of the substrate. The cantilever is configured to adjust a height of the tip. In an example, the tip physically contacts the surface of the substrate. In an example, the apparatus further includes at least two other cantilever structures, wherein the cantilever structure contacts the surface of the substrate at a first location and each of the other cantilever structures is configured to contact the surface of the substrate at locations different than the first location.

An exemplary cantilever-based sensor for leveling a substrate includes an optical sensor and a cantilever structure disposed between the optical sensor and the substrate. The cantilever structure includes a first cantilever structure and a second cantilever structure. The first cantilever structure includes a first cantilever having a first surface and a second surface opposite the first surface, a first reflective film deposited on the second surface of the first cantilever, and a first tip attached to the first surface of the first cantilever, wherein the first tip is configured to contact a surface of the substrate at a first location. The second cantilever structure including a second cantilever having a first surface and a second surface opposite the first surface, a second reflective film deposited on the second surface of the second cantilever, and a second tip attached to the first surface of the second cantilever, wherein the second tip is configured to contact the surface of the substrate at a second location. The optical sensor is configured to detect light reflected from the first reflective film and the second reflective film and, based on the detected reflected light from the first reflective film and the second reflective film, respectively determine a first distance between the optical sensor and the surface of the substrate at the first location and a second distance between the optical sensor and the surface of the substrate at the second location, such that the substrate is leveled based on the first distance and the second distance. The first cantilever structure has a first height, and the second cantilever structure has a second height. The optical sensor determines the first distance based on the first height and a distance between the first reflective film and the optical sensor and the second distance based on the second height and a distance between the second reflective film an the optical sensor. In an example, the optical sensor includes a first optical sensor and a second optical sensor, where the first cantilever structure is disposed between the first optical sensor and the surface of the substrate at the first location, the second cantilever structure is disposed between the second optical sensor and the surface of the substrate at the second location, and the first optical sensor is configured to determine the first distance and the second optical sensor is configured to determine the second distance. In an example, the first tip physically contacts the surface of the substrate at the first location and the second tip physically contacts the surface of the substrate at the second location. The cantilever-based sensor may further include a ground electrode coupled to the cantilever structure such that electric charge is drained from the surface of the substrate.

An exemplary method of leveling a substrate in a charged particle lithography system includes positioning a first cantilever structure over a surface of the substrate at a first location and a second cantilever structure over the surface of the substrate at a second location; measuring a first distance between a first reflective film of the first cantilever structure and an first optical sensor; measuring a second distance between a second reflective film of the second cantilever structure and a second optical sensor; determining a third distance between the first optical sensor and the surface of the substrate at the first location based on the first distance; determining a fourth distance between the second optical sensor and the surface of the substrate at the second location based on the second distance; and leveling the substrate based on the third distance and the fourth distance. The third distance may be determined by adding the first distance to a height of the first cantilever structure at the first location, and the fourth distance may be determined by adding the second distance to a height of the second cantilever structure at the second location. In an example, the substrate is leveled by adjusting a position of the substrate such that the third distance is equivalent to the fourth distance. Measuring the first distance may include projecting a first measurement light onto the first reflective film of the first cantilever structure and receiving, by the first optical sensor, light reflected from the first reflective film of the first cantilever structure. Measuring the second distance may includes projecting a second measurement light onto the second reflective film of the second cantilever structure and receiving, by the second optical sensor, light reflected from the second reflective film of the second cantilever structure. Positioning the first cantilever structure over the surface of the substrate at the first location may include positioning a first tip of the first cantilever structure such that the first tip physically contacts the surface of the substrate at the first location; and positioning the second cantilever structure over the surface of the substrate at the second location may include positioning a second tip of the second cantilever structure such that the second tip physically contacts the surface of the substrate at the second location.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for leveling a substrate in a charged particle lithography system, the apparatus comprising:
    an optical sensor;
    a cantilever structure disposed between the optical sensor and the substrate, wherein the cantilever structure includes:
        a cantilever having a first surface and a second surface opposite the first surface,
        a reflective film deposited on the second surface of the cantilever, and a tip attached to the first surface of the cantilever, wherein the tip is configured to contact a surface of the substrate; and
    wherein the optical sensor is configured to direct a measurement light onto the reflective film, detect a light reflected from the reflective film, and determine a distance between the optical sensor and the surface of the substrate based on the detected reflected light, such that the substrate is leveled with respect to the charged particle lithography system based on the distance.

2. The apparatus of claim 1, further comprising a ground electrode connected to the cantilever structure such that electric static charge is drained from the surface of the substrate through the tip, the cantilever, and the ground electrode.

3. The apparatus of claim 1, wherein the optical sensor includes a light source for emitting the measurement light onto the reflective film, a light detector for receiving the reflected light from the reflective film, and a processor for determining the distance between the optical sensor and the surface of the substrate.

4. The apparatus of claim 1, wherein the optical sensor further determines the distance based on a height of the cantilever structure.

5. The apparatus of claim 1, wherein the cantilever is configured to adjust a height of the tip.

6. The apparatus of claim 1, wherein the cantilever includes metal.

7. The apparatus of claim 1, wherein the tip physically contacts the surface of the substrate.

8. The apparatus of claim 1, wherein the tip includes metal.

9. The apparatus of claim 1, wherein the reflective film includes metal.

10. The apparatus of claim 1, further including at least two other cantilever structures, wherein the cantilever structure contacts the surface of the substrate at a first location and each of the cantilever structures is configured to contact the surface of the substrate at locations different than the first location.

11. A cantilever-based sensor for leveling a substrate, the cantilever-based sensor comprising:
    an optical sensor;
    a cantilever structure disposed between the optical sensor and the substrate, wherein the cantilever structure includes:
        a first cantilever structure including a first cantilever having a first surface and a second surface opposite the first surface, a first reflective film deposited on the second surface of the first cantilever, and a first tip attached to the first surface of the first cantilever, wherein the first tip is configured to contact a surface of the substrate at a first location, and
        a second cantilever structure including a second cantilever having a first surface and a second surface opposite the first surface, a second reflective film deposited on the second surface of the second cantilever, and a second tip attached to the first surface of the second cantilever, wherein the second tip is configured to contact the surface of the substrate at a second location; and
    wherein the optical sensor is configured to detect light reflected from the first reflective film and the second reflective film and, based on the detected reflected light from the first reflective film and the second reflective film, respectively determine a first distance between the optical sensor and the surface of the substrate at the first location and a second distance between the optical sensor and the surface of the substrate at the second location, such that the substrate is leveled based on the first distance and the second distance.

12. The apparatus of claim 11 wherein:
    the first cantilever structure has a first height;
    the second cantilever structure has a second height; and
    the optical sensor determines the first distance based on the first height and a distance between the first reflective film and the optical sensor and the second distance based on the second height and a distance between the second reflective film and the optical sensor.

13. The apparatus of claim 11 wherein:
the optical sensor includes a first optical sensor and a second optical sensor;
the first cantilever structure is disposed between the first optical sensor and the surface of the substrate at the first location;
the second cantilever structure is disposed between the second optical sensor and the surface of the substrate at the second location; and
the first optical sensor is configured to determine the first distance and the second optical sensor is configured to determine the second distance.

14. The apparatus of claim 11 wherein the first tip physically contacts the surface of the substrate at the first location and the second tip physically contacts the surface of the substrate at the second location.

15. The apparatus of claim 11 further including a ground electrode coupled to the cantilever structure such that electric charge is drained from the surface of the substrate.

16. A method of leveling a substrate in a charged particle lithography system, the method comprising:
positioning a first cantilever structure over a surface of the substrate at a first location and a second cantilever structure over the surface of the substrate at a second location;
measuring a first distance between a first reflective film of the first cantilever structure and a first optical sensor;
measuring a second distance between a second reflective film of the second cantilever structure and a second optical sensor;
determining a third distance between the first optical sensor and the surface of the substrate at the first location based on the first distance;
determining a fourth distance between the second optical sensor and the surface of the substrate at the second location based on the second distance; and
leveling the substrate with respect to the charged particle lithography system based on the third distance and the fourth distance.

17. The method of claim 16, wherein:
determining the third distance includes adding the first distance to a height of the first cantilever structure at the first location; and
determining the fourth distance includes adding the second distance to a height of the second cantilever structure at the second location.

18. The method of claim 16 wherein the leveling the substrate includes adjusting a position of the substrate such that the third distance is equivalent to the fourth distance.

19. The method of claim 16, wherein:
the measuring the first distance includes projecting a first measurement light onto the first reflective film of the first cantilever structure and receiving, by the first optical sensor, light reflected from the first reflective film of the first cantilever structure; and
the measuring the second distance includes projecting a second measurement light onto the second reflective film of the second cantilever structure and receiving, by the second optical sensor, light reflected from the second reflective film of the second cantilever structure.

20. The method of claim 16, wherein:
positioning the first cantilever structure over the surface of the substrate at the first location includes positioning a first tip of the first cantilever structure such that the first tip physically contacts the surface of the substrate at the first location; and
positioning the second cantilever structure over the surface of the substrate at the second location includes positioning a second tip of the second cantilever structure such that the second tip physically contacts the surface of the substrate at the second location.

* * * * *